United States Patent
Cheng et al.

(10) Patent No.: US 8,020,143 B2
(45) Date of Patent: Sep. 13, 2011

(54) REMOTE ASPECT ADVISING FOR AN ASPECT-ORIENTED PROGRAM

(75) Inventors: Cheng-chieh Cheng, Rochester, MN (US); Teresa Chung Kan, Rochester, MN (US); Jian Tang, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1282 days.

(21) Appl. No.: 11/621,663

(22) Filed: Jan. 10, 2007

(65) Prior Publication Data

US 2008/0168422 A1    Jul. 10, 2008

(51) Int. Cl.
*G06F 9/44*    (2006.01)

(52) U.S. Cl. ........ 717/106; 717/108; 717/116; 717/140; 717/148; 717/165

(58) Field of Classification Search .................. 717/106, 717/108, 116
See application file for complete search history.

(56) References Cited

U.S. PATENT DOCUMENTS

| | | | | |
|---|---|---|---|---|
| 6,467,086 B1 * | 10/2002 | Kiczales et al. | ............. | 717/165 |
| 6,473,895 B1 * | 10/2002 | Lopes et al. | ................ | 717/128 |
| 6,539,390 B1 * | 3/2003 | Kiczales et al. | .................... | 1/1 |
| 7,140,007 B2 * | 11/2006 | Lamping | ...................... | 717/154 |
| 7,398,426 B2 * | 7/2008 | Colyer | ............................ | 714/38 |
| 7,743,282 B2 * | 6/2010 | Colyer | ............................ | 714/38 |
| 2004/0006765 A1 * | 1/2004 | Goldman | ...................... | 717/116 |
| 2007/0124723 A1 * | 5/2007 | Chapman et al. | ............. | 717/106 |

* cited by examiner

*Primary Examiner* — Thomas K Pham
(74) *Attorney, Agent, or Firm* — Martin & Associates, LLC; Derek P. Martin

(57) ABSTRACT

An aspect-oriented system includes a way to access both local and remote advice that is consistent with the modularity concerns of an aspect-oriented program. During compilation of the aspect-oriented program, a weaver determines whether advice referenced by an aspect is local or remote. If the advice is local, the weaver applies the local advice to the base program. If the advice is remote, the weaver generates remote invocation code that may include client stubs and server code to handle the marshalling and unmarshalling of parameters. Invocations to the client stub are then inserted into the join points of the base program. At run-time, the server name and number that has the remote aspect is determined. When the client stub is invoked, the remote advice on the specified server may be accessed. The result is an improved weaver that may generate code to access remote advice in a different JVM.

17 Claims, 7 Drawing Sheets

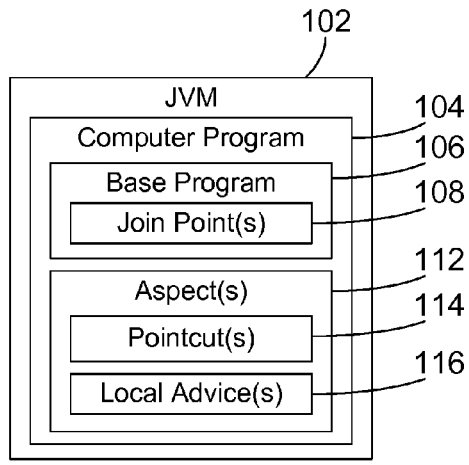

FIG. 1

Base program:
```
class Transaction { public void executeSynchronously() {      —— 210
                . . .
        } public void executeAsynchronously() {     —— 220
                . . .
        }
}
```

FIG. 2

Aspect Logging:
```
public aspect Logging {
        private TransactionLogger logger = TransactionLogger.getLogger();   —— 310 pointcut logging():
                execution(void Transaction.execute*(...)) && !within(Logging);   >— 320 before(): logging() {
                Signature sig = thisjoinPointStatcPart.getSignature();    >— 330
                logger.log(logParams);
        }
}
```

FIG. 3

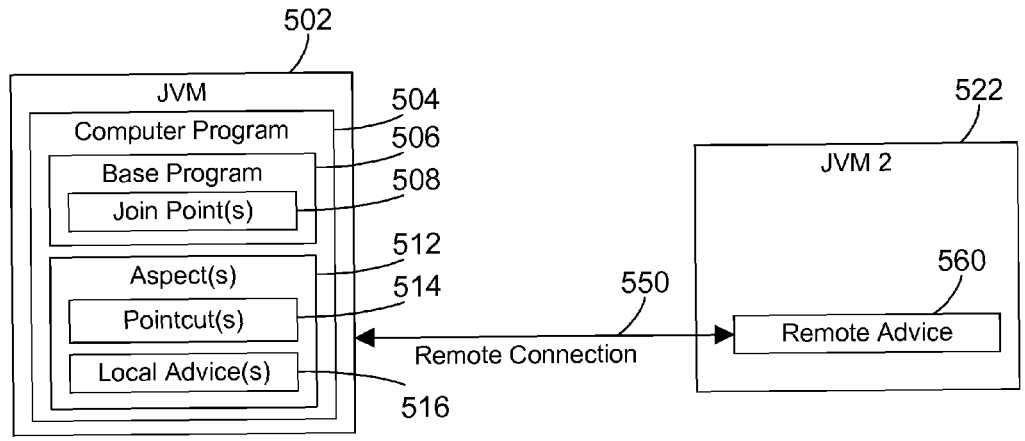

FIG. 5

```
public aspect Logging {
      private TransactionLogger logger = TransactionLogger.getLogger();

pointcut logging()
            : execution(void Transaction.execute*(..)) && !within(TraceAspect);

before() : logging() {
            Signature sig = thisJoinPointStaticPart.getSignature();

// compile a logging message.
            Message m = new Message(sig.getDeclaringType().getName(), xxx);

// get a connection from the connection pool.
            Connection conn = connPool.getConnection();
            OutputStream writer = conn.getOutputStream();

// send the message to the server so the server logs it.
            writer.write( message );
            writer.flush();

... ... ...
      }
} public class ConnectionPool {
      ...
} public class Connection {
      ...
}
```
⎫
⎬ 610
⎭

FIG. 6

Configuration File

```
// Weaved program
class Transaction { public void executeSynchronously() {
                // The logging is weaved here // 1. Locate the remote Logger object using remoteLoggerObjectName
                Aspect_Logger logger = lookup(remoteLoggerObjectName);

// 2. Call the logger method with logging parameters
                logger.log(logParams);

.......
        }
}
```

910

```
// for example if we use CORBA as the client server communication
implementation mechanism
public void log(String[] args) throws RemoteException {
    try {
        org.omg.CORBA_2_3.portable.InputStream in = null;
        try {
            org.omg.CORBA_2_3.portable.OutputStream out =
(org.omg.CORBA_2_3.portable.OutputStream) _request(
                    "logging", true);
            out.write_value(args, String[].class);
            _invoke(out);
            return;
        } catch (ApplicationException ex) {
            // todo
        } catch (RemarshalException ex) {
            // todo
        } finally {
            _releaseReply(in);
        }
    } catch (SystemException ex) {
        // todo
    }
}
```
— 1040
— 1050
— 1060

FIG. 10

Property File serverHostName=localHost
serverPortNumber=9876    — 1100

FIG. 11

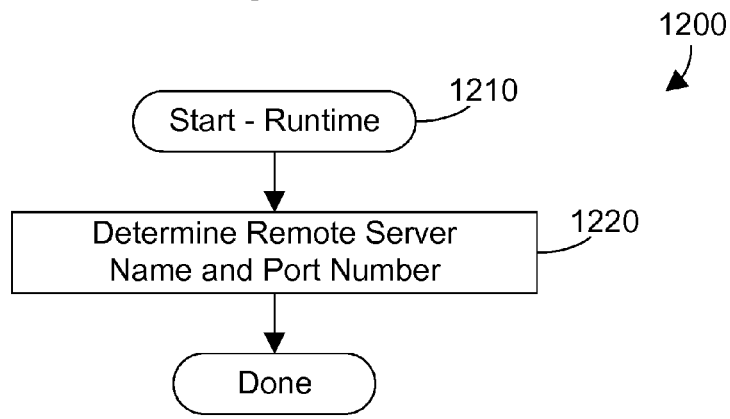

FIG. 12

REMOTE ASPECT ADVISING FOR AN ASPECT-ORIENTED PROGRAM

BACKGROUND

1. Technical Field

This disclosure generally relates to computer software, and more specifically relates to ways for processing an aspect-oriented program.

2. Background Art

Object-oriented programming was developed to enhance the reusability of code by dividing the code into modular chunks called objects. An object may contain data along with methods that may be called to perform desired operations. An object has a defined interface for accessing its methods and data, which enhances reusability of the object because the internal implementation of the object may be changed without affecting the interface. The implementation of an object is said to be "encapsulated" within the object. The result is objects in a program that cooperate to perform the desired functions of the program, while potentially allowing the objects to be reused for other programs.

One problem that was discovered in object-oriented programs is the difficulty of generating objects that are truly reusable across many different programs. One thing that makes object-oriented programs less reusable is functions (or concerns) that cut across many different objects. For example, logging is an example of a crosscutting concern, because a logging strategy necessarily affects every single logged part of the system. Logging thereby crosscuts all logged classes and methods in an object-oriented program.

A new paradigm known as aspect-oriented programming was developed that allows crosscutting concerns to be encapsulated in one place, thereby enhancing the reusability of the code. In an aspect-oriented program, an aspect can alter the behavior of the base program (the non-aspect part of a program) by applying advice (additional behavior) at various join points (points in a program) specified in a quantification or query called a pointcut (that detects whether a given join point matches). A join point specifies where an advice can potentially run. Join points are points in a program where additional behavior can be usefully joined. Pointcuts are ways to specify join points. Pointcuts determine whether a given join point matches. Advice is typically contained within an aspect. Advice is a means for specifying code that contains additional behavior to run at a join point. The combination of pointcuts and advices in aspects that are separate from the base program allows crosscutting concerns to be implemented in an aspect-oriented program in a clean and modular way.

Current aspect-oriented compilers work on base programs and aspects that are in the same Java Virtual Machine (JVM), that is, they assume the base program and the aspect call each other using same-JVM method calls. While this works fine for many applications, it is not ideal when advice needs to be located remotely, such as in a distributed computing system. To communicate with advice that is located remotely, current aspect-oriented compilers require the programmer to place code in the base program that establishes a connection and invokes the advice remotely. This manual insertion of code by a programmer to access remote advice decreases the modularity and reusability of the program, and may cause portability problems if a specific communication protocol is used. Without a way to access remote advice in a way that does not negatively affect the reusability and portability of the program, the software industry will continued to be hampered by requiring that programmers insert code in the base program to handle remote access to advice.

BRIEF SUMMARY

An aspect-oriented system includes a way to access both local and remote advice for aspects in a way that is consistent with the modularity concerns of an aspect-oriented program. During compilation of the aspect-oriented program, a weaver determines whether the aspect references local or remote advice. If the advice is local, the weaver functions as in the prior art to apply the local advice to the base program. If the advice is remote, the weaver generates client stubs and server code to handle the marshalling and unmarshalling of parameters based on the protocol specified. If no protocol is specified, a default protocol can be used. Invocations to the client stub are then inserted into the join points of the base program. At run-time, the server name and port number that has the remote advice is determined. When the client stub is invoked, the remote advice on the specified server may be accessed. The result is an improved aspect-oriented compiler that includes a weaver that may access remote advice in a different Java Virtual Machine (JVM). In addition, the base program and aspects are portable to any distributed system by simply plugging in different weaving protocols at compile time.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

FIG. 1 is a block diagram of a prior art aspect-oriented computer program running in a Java Virtual Machine (JVM);

FIG. 2 is a sample code snippet that shows a sample base program;

FIG. 3 is a sample code snippet showing a sample aspect for logging;

FIG. 5 is a block diagram of a system for accessing remote advice in a different JVM via a remote connection when compiling a computer program;

FIG. 6 is a sample code snippet for the Logging aspect that allows accessing remote advice as shown in FIG. 5;

FIG. 10 is a sample code snippet showing a sample client stub if the Common Object Request Broker Architecture (CORBA) is used as the client/server protocol;

FIG. 11 is a sample property file that allows determining the server host name and port number at runtime;

FIG. 12 is a flow diagram of a method that is performed at runtime to determine the remote server name and port number from the property file shown in FIG. 11.

DETAILED DESCRIPTION

Figure 4:
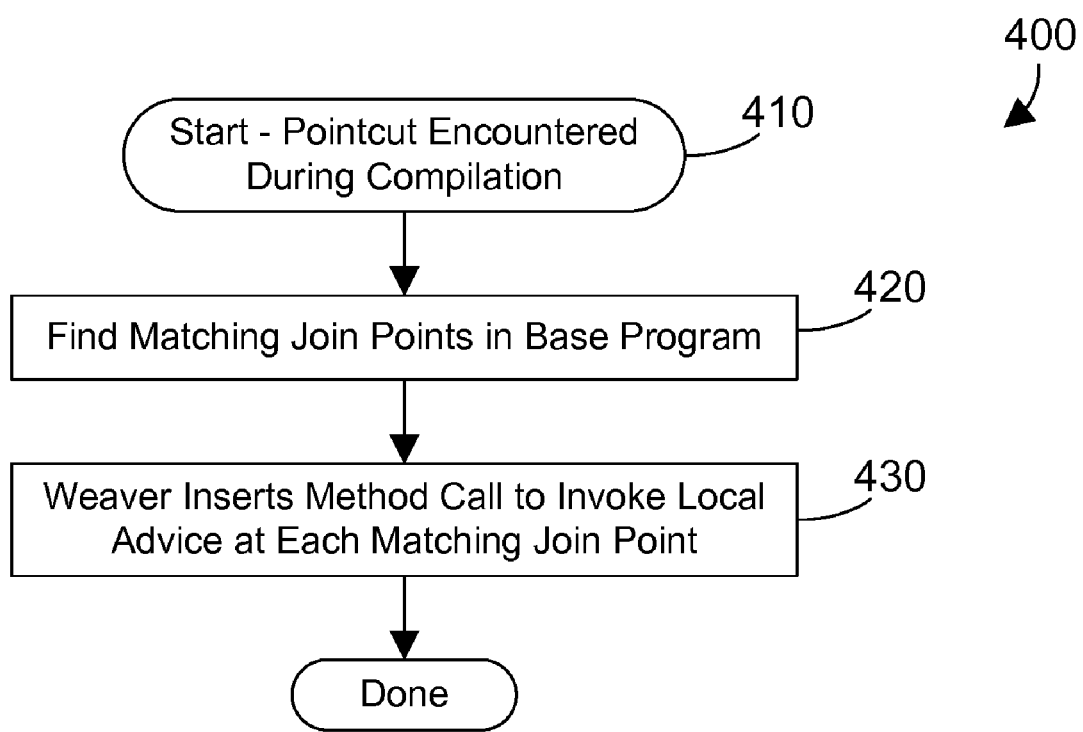
FIG. 4 is a flow diagram of a prior art method for compiling an aspect-oriented program that includes only local advice.

Known aspect-oriented compilers require advice for aspects referenced in a program that is being compiled to be within the same Java Virtual Machine (JVM) as the program being compiled. The disclosure and claims herein are directed to a weaver for an aspect-oriented compiler that runs in one JVM and may access advice in a different JVM. The result is a weaver that may weave both local and remote advice without requiring the programmer to write code to access the remote advice.

Referring to FIG. 1, a JVM 102 contains a computer program 104, which is preferably an aspect-oriented program. Program 104 preferably includes a base program 106 with one or more join points 108, and one or more aspects 112 that each contain one or more pointcuts 114 and one or more local advices 116. The join points 108 determine when advice in an aspect can be run. The pointcuts 114 are ways to specify or quantify join points. In other words, pointcuts 114 determine whether a given join point matches. The local advices 116 are in the form of code that may be run at a join point. Advice 116 in an aspect 112 may be specified to run before, after, and around join points.

A sample base program is shown in FIG. 2 to include two methods, executeSynchronously( ) at 210 and executeAsynchronously( ) at 220. A sample aspect in FIG. 3 is shown for logging information. The Logging aspect specifies a logger that invokes a getLogger( ) method on the TransactionLogger class as shown at 310. The Logging aspect also includes a pointcut called logging( ) at 320 that specifies a join point when execution of a method from the Transaction class that includes execute as the first part of the method name (Transaction.execute*( )) when the method is outside of the Logging aspect (!within(Logging)). The logging aspect also specifies advice at 330 that states that before the logging( ) method is invoked (before( ): logging( )), a signature sig is obtained by invoking the getSignature( ) method on the thisJoinPoint-StatcPart class. The logo method on the logger class is then invoked, passing logParams as a parameter (logger.log(logParams)).

FIG. 4 shows a prior art method 400 for processing a pointcut during compilation of a program, such as program 104 in FIG. 1. Method 400 begins when a pointcut is encountered during compilation (step 410). It then finds all matching join points in the base program (step 420). The weaver inserts a method call to invoke the local advice at each matching join point (step 430). The location of the inserted method call depends on the type of advice (e.g., before, after, or around). Method 400 is a general representation of the current state of the art that shows how a known aspect-oriented compiler with a known weaver processes a pointcut during compilation.

Current aspect-oriented compilers assume aspects have only local advice, meaning the advice is in the same Java Virtual Machine (JVM) as the base program being compiled. Therefore, direct method calls to invoke the aspects are used. However, there are times when using remote advice may be useful. For example, in the sample system shown in FIG. 5, a first JVM 502 includes a computer program 504 that includes a base program 506 with one or more join points 508, and one or more aspects 512 that each include one or more pointcuts 514 and one or more local advices 516. In addition, a separate JVM 522 that is remote from the first JVM 502 includes remote advice 560 that is coupled to the first JVM 502 via a remote connection 550 and that corresponds to an aspect 512 in the computer program 504.

Because the prior art AOP compiler cannot weave remote advice that is in a separate JVM, the programmer that writes the computer program 504 must manually program into an aspect 512 the code required to make the remote connection 550 and read the remote advice 560. A Logging aspect that includes code to retrieve information from the remote advice 560 is shown in the code snippet in FIG. 6. Note that the code shown at 610 in FIG. 6 is code not included in the original Logging aspect shown in FIG. 3 that is required to establish a connection to the remote advice and to read the remote advice.

Adding the additional code 610 in FIG. 6 makes the logging aspect in FIG. 6 much less reusable and portable than the logging aspect 300 shown in FIG. 3, because it is now hardcoded to be specific to the remote advice and is specific to a specific client/server protocol. The differences between using local advice and using remote advice can be accounted for in a weaver that can distinguish between local advice and remote advice. When the advice is local, the advice is applied similar to the way it is done in the prior art. When the advice is remote, client/server code (also referred to herein as remote invocation code) is automatically generated by the weaver, and remote invocations are inserted at the join points for the program. In this manner, the differences between local and remote advice are taken care of under-the-covers by the weaver, and the programmer is no longer burdened with adding new code as shown at 610 in FIG. 6 to account for remote advice. In addition, the resulting code is portable to systems with different protocols by simply specifying to the weaving mechanism which protocol to use.

Figure 7:
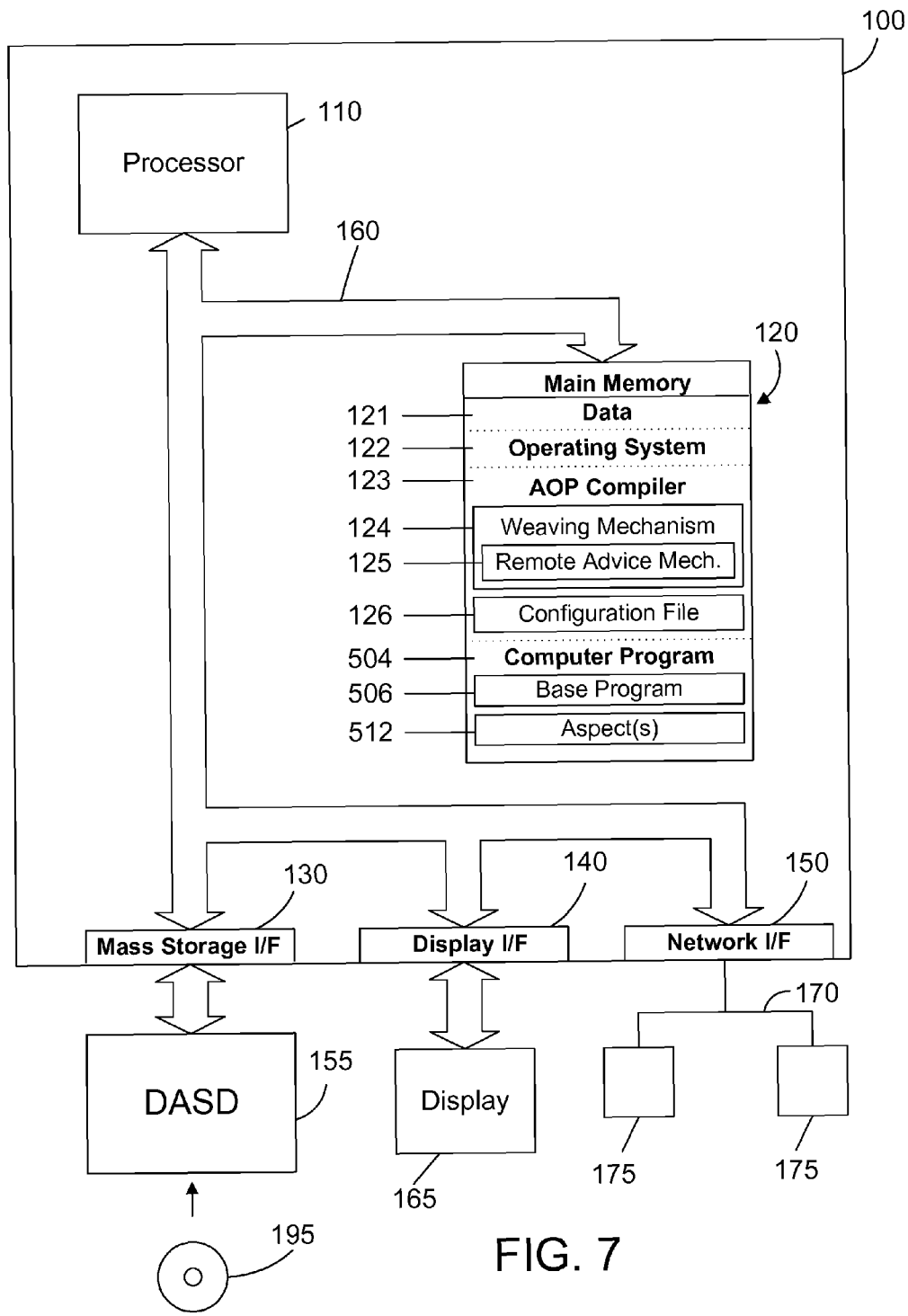
FIG. 7 is a block diagram of a computer apparatus that performs weaving of remote advice.

Referring to FIG. 7, a computer system 100 is one suitable implementation of a computer system apparatus that includes a weaving mechanism that can handle both local and remote advice automatically. Computer system 100 is an IBM eServer System i computer system. However, those skilled in the art will appreciate that the disclosure herein applies equally to any computer system, regardless of whether the computer system is a complicated multi-user computing apparatus, a single user workstation, or an embedded control system. As shown in FIG. 7, computer system 100 comprises one or more processors 110, a main memory 120, a mass storage interface 130, a display interface 140, and a network interface 150. These system components are interconnected through the use of a system bus 160. Mass storage interface 130 is used to connect mass storage devices, such as a direct access storage device 155, to computer system 100. One specific type of direct access storage device 155 is a readable and writable CD-RW drive, which may store data to and read data from a CD-RW 195.

Main memory 120 preferably contains data 121, an operating system 122, an aspect-oriented programming (AOP) compiler 123, and a computer program 504 that is preferably an aspect-oriented program. Data 121 represents any data that serves as input to or output from any program in computer system 100. Operating system 122 is a multitasking operating system known in the industry as i5/OS; however, those skilled in the art will appreciate that the spirit and scope of this disclosure is not limited to any one operating system. The AOP compiler 123 is any suitable compiler for aspect-oriented programs, whether currently known or developed in the future. AspectJ is one suitable example of an aspect-oriented compiler. The AOP compiler 123 includes a weaving mechanism 124 that includes a remote advice mechanism 125 that is capable of accessing advice in different JVMs. This is in contrast to known weaving mechanisms that are only capable of accessing advice in the same JVM as where the base program is located. In addition, the AOP compiler 123 includes a configuration file 126 that includes metadata that specifies whether the defined aspects reference local or remote advice.

The computer program 504 includes a base program 506 and one or more aspects 512. The base program 506 includes one or more join points 508, and each aspect 512 includes one or more pointcuts 514 and one or more advices 516, as shown in FIG. 5. As described above, a join point 508 specifies when advice can potentially run. Join points 508 are points in a program where additional behavior can be usefully joined. Pointcuts 514 are ways to specify at which join points 520 the weaving mechanism 124 should insert advice. Pointcuts 514 determine whether a given join point 508 matches. Advice 516 is typically contained within an aspect 512. Advice is a means for specifying code to run at a join point.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 121, operating system 122, AOP compiler 123 and computer program 510 are shown to reside in main memory 120, those skilled in the art will recognize that these items are not necessarily all completely contained in main memory 120 at the same time. It should also be noted that the term "memory" is used herein generically to refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122.

Although computer system 100 is shown to contain only a single processor and a single system bus, those skilled in the art will appreciate that weaving of remote advice may be practiced using a computer system that has multiple processors and/or multiple buses. In addition, the interfaces that are used preferably each include separate, fully programmed microprocessors that are used to off-load compute-intensive processing from processor 110. However, those skilled in the art will appreciate that these functions may be performed using I/O adapters as well.

Display interface 140 is used to directly connect one or more displays 165 to computer system 100. These displays 165, which may be non-intelligent (i.e., dumb) terminals or fully programmable workstations, are used to provide system administrators and users the ability to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect computer system 100 to other computer systems, workstations or media sources (e.g., 175 in FIG. 7). Network interface 150 and network 170 broadly represent any suitable way to interconnect electronic devices, regardless of whether the network 170 comprises present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

At this point, it is important to note that while the description above is in the context of a fully functional computer system, those skilled in the art will appreciate that the weaver mechanism that allows weaving of remote advice may be distributed as a program product in a variety of forms, and that the claims extend to all suitable types of computer-readable media used to actually carry out the distribution. Examples of suitable computer-readable media include: recordable media such as floppy disks and CD-RW (e.g., 195 of FIG. 7), and transmission media such as digital and analog communications links.

Embodiments herein may also be delivered as part of a service engagement with a client corporation, nonprofit organization, government entity, internal organizational structure, or the like. These embodiments may include configuring a computer system to perform some or all of the methods described herein, and deploying software, hardware, and web services that implement some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

Figures 8, 9:
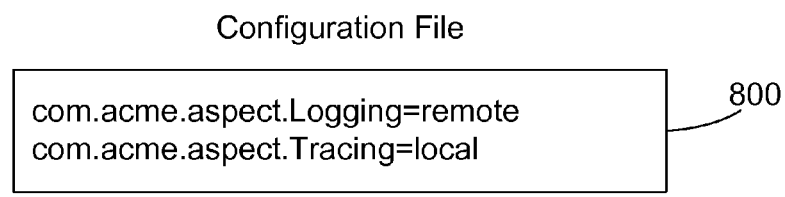
FIG. 8 is a sample configuration file that indicates to the weaving mechanism 124 in FIG. 7 whether advice referenced by an aspect is local or remote.
FIG. 9 is a sample code snippet showing a weaved program that results from applying remote advice to the base program in FIG. 2.

Referring now to FIG. 8, a configuration file 800 is one suitable example of metadata that specifies whether advice for an aspect is local or remote. In the configuration file 800 shown in FIG. 8, the aspect com.acme.aspect.Logging is specified as an aspect with remote advice, while the aspect com.acme.aspect.Tracing is specified as an aspect with local advice. The weaving mechanism analyzes the metadata in the configuration file to determine whether an aspect has local or remote advice. If the advice is local, the weaving mechanism weaves the advice from the local aspect into the base program similar to how it was done in the prior art. If, however, the advice is remote, the weaving mechanism automatically generates under-the-covers remote invocation code to effect the communication of the remote aspect with the weaving mechanism in a way that is transparent to the programmer. In this manner, the way a programmer writes an aspect is the same regardless of whether the aspect has local or remote advice, and if the aspect has remote advice, the weaving mechanism takes care of the remote communication in a way that is transparent to the client. In addition, a protocol could be specified to the weaving mechanism so the weaving mechanism knows which protocol to use for a remote invocation. Common Object Request Broker Architecture (CORBA) is an example of one suitable protocol for a remote invocation.

FIG. 9 shows a code snippet that illustrates a weaved program that was derived from applying the advice 330 in the aspect of FIG. 3 to the base program in FIG. 2, assuming the advice 330 was remote advice, as shown at 560 in FIG. 5. Note that the logging is weaved in at 910 shown in FIG. 9. Because the weaving mechanism automatically generates the client stub and server code (e.g., server skeleton), and invokes the client stub to access the remote advice, the remote advice may be used without the client code having any explicit instructions to establish a connection with the remote advice or to read the remote advice. The result is a weaving mechanism that can handle advice from both local and remote aspects without any special effort on the part of the programmer. All the programmer does is program the aspect, then specify in metadata (e.g., the configuration file in FIG. 8)

whether each aspect has local or remote advice. If the advice is remote, the weaving mechanism takes care of performing the necessary steps for reading the advice from the remote location under-the-covers.

Referring to FIG. 10, a code snippet is shown as one possible implementation of a client stub if we assume CORBA is the protocol used to implement client/server communications. First, an OutputStream is created that writes the parameters to the remote server by calling the _request( ) method with the method name "logging" at 1040. Then the logging parameters are written to this OutputStream at 1050. Finally, the _invoke( ) method is called at 1060 to invoke the remote method on the server side which represents the logging advice.

At run-time, the weaver must determine the name and port number of the host that includes a remote aspect that needs to be accessed. Referring to FIG. 11, a property file 1100 is one simple way to specify the name and port number for a host. In the example in FIG. 11, the name of the server is localHost, and the server port number is 9876. Referring to FIG. 12, method 1200 starts at runtime (step 1210). The weaving mechanism determines the remote server name and port number (step 1220). By reading the property file, the weaving mechanism knows where and how to access remote advice for an aspect.

Figure 13:
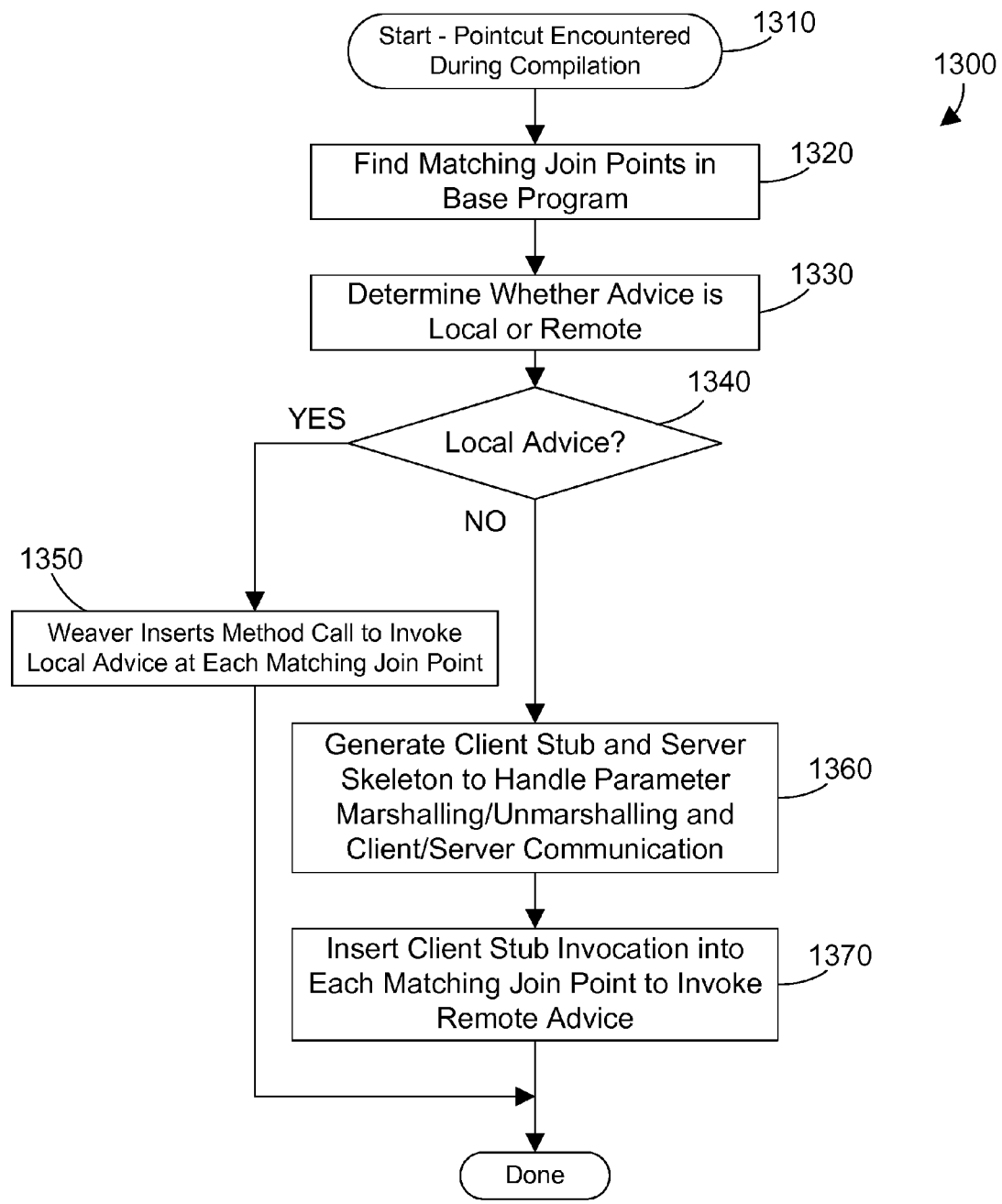
FIG. 13 is a flow diagram of a method for weaving advice referenced by an aspect into a base program when the advice may be either local or remote.

Referring to FIG. 13, a method 1300 starts when a pointcut is encountered during compilation (step 1310). Note that method 1300 is preferably performed by the weaving mechanism 124 shown in FIG. 7. All matching join points in the base program are found (step 1320). Method 1300 then determines whether the advice for the aspect is local or remote (step 1330). As explained above, one suitable way to determine whether the advice is local or remote is to read metadata associated with the aspect, such as the configuration file 800 shown in FIG. 8. If the advice is local (step 1340=YES), the weaving mechanism inserts a method call to invoke the local aspect at each matching join point in the base program (step 1350), as was done in the prior art. If the advice is remote (step 1340=NO), the weaver (i.e., weaving mechanism) generates a client stub and a server code (such as a server skeleton) to handle parameter marshalling/unmarshalling and to handle the client/server communication (step 1360). Invocations to the client stub are then inserted into each matching join point (step 1370). Because the weaving mechanism automatically generates code to take care of accessing remote advice for an aspect, neither the base program nor the aspect need to have any specific instructions relating to client/server communications because the reading of the remote advice from a server is automatically handled by the weaving mechanism.

In one specific implementation, the determination of whether advice for an aspect is local or remote in step 1340 of FIG. 13 is made by determining whether the advice resides within the same JVM as the base program. If the advice resides in the same JVM as the base program, the advice is local. If the advice resides in a different JVM than the base program, the advice is remote. Of course, other criteria or heuristics could be used to determine whether advice is local or remote, and the disclosure and claims herein expressly extend to any suitable method or way of determining whether advice for an aspect is local or remote.

The disclosure herein includes a weaving mechanism that can handle aspects with remote advice as well as aspects with local advice. If the advice is remote, the weaving mechanism automatically generates remote invocation code that allows the weaving mechanism to read the remote advice without the program being compiled having any explicit instructions to establish a connection and communicate with the remote advice. This allows a computer program being compiled in one JVM to access advice in a different JVM in a modular and portable way.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

What is claimed is:

1. An apparatus comprising:
   at least one processor;
   a memory coupled to the at least one processor;
   a base program residing in the memory that references an aspect that references advice; and
   a weaving mechanism residing in the memory and executed by the at least one processor, the weaving mechanism determining whether the advice referenced by the aspect is local or remote, and when the advice is remote, the weaving mechanism generates remote invocation code that allows accessing the advice, accesses the advice, and weaves the advice into the base program, wherein the remote invocation code comprises:
      a client stub to handle parameter marshalling and unmarshalling;
      at least one call to the client stub inserted into the base program; and
      server code called by the client stub.

2. The apparatus of claim 1 wherein the weaving mechanism determines whether the advice is local or remote by analyzing metadata associated with the aspect that references the advice.

3. The apparatus of claim 1 further comprising a first Java Virtual Machine (JVM) that executes the base program and wherein a remote aspect accessed by the weaving mechanism is in a second JVM.

4. The apparatus of claim 1 wherein the weaving mechanism identifies at runtime a server computer system that contains the aspect.

5. A networked computer system comprising:
   a first computer system comprising advice; and
   a second computer system coupled to the first computer system, the second computer system comprising a base program that references an aspect that references the advice, the second computer system further comprising a weaving mechanism that determines when the advice is not on the second computer system, and when the advice is not on the second computer system, the weaving mechanism generates remote invocation code that allows accessing the advice on the first computer system, wherein the weaving mechanism accesses the advice on the first computer system and weaves the advice into the base program on the second computer system, wherein the remote invocation code comprises:
      a client stub to handle parameter marshalling and unmarshalling;
      at least one call to the client stub inserted into the base program; and
      server code called by the client stub.

6. The networked computer system of claim 5 wherein the weaving mechanism determines whether the advice is local or remote by analyzing metadata associated with the aspect that references the advice.

7. The networked computer system of claim 5 wherein the advice in the first computer system is in a first Java Virtual Machine (JVM) and the base program in the second computer system is in a second JVM.

8. The networked computer system of claim 5 wherein the weaving mechanism identifies at runtime the first computer system that contains the aspect.

9. A computer-implemented method for weaving advice referenced by an aspect into a base program in a distributed environment, the method comprising the steps of:
   determining whether the advice is local or remote;
   when the advice is remote, generating remote invocation code that allows accessing the advice by performing the steps of:
      generating a client stub to handle parameter marshalling and unmarshalling;
      generating server code that is called by the client stub; and
      inserting at least one invocation to the client stub into at least one join point in the base program;
   accessing the advice; and
   weaving the advice into the base program.

10. The method of claim 9 wherein the step of determining whether the advice is local or remote is performed by analyzing metadata associated with the aspect that references the advice.

11. The method of claim 9 wherein the advice is in a first Java Virtual Machine (JVM) and the base program is in a second JVM.

12. The method of claim 9 wherein the weaving mechanism identifies at runtime a server computer system that contains the advice.

13. A method for deploying computing infrastructure, comprising integrating computer readable code into a computing system, wherein the code in combination with the computing system perform the method of claim 9.

14. A computer-readable program product residing on recordable media, the program product comprising:
   a weaving mechanism that determines whether advice referenced by an aspect referenced by a base program is local or remote, and when the advice is remote, the weaving mechanism generates remote invocation code that allows accessing the advice, accesses the advice, and weaves the advice into the base program, wherein the remote invocation code comprises:
      a client stub to handle parameter marshalling and unmarshalling;
      at least one call to the client stub inserted into the base program; and
      server code called by the client stub.

15. The program product of claim 14 wherein the weaving mechanism determines whether the advice is local or remote by analyzing metadata associated with the aspect that references the advice.

16. The program product of claim 14 wherein the aspect is in a first Java Virtual Machine (JVM) and the base program is in a second JVM.

17. The program product of claim 14 wherein the weaving mechanism identifies at runtime a server computer system that contains the aspect.

* * * * *